Dec. 17, 1929.  C. C. PINCKNEY  1,740,033
METHOD AND APPARATUS FOR CONSTRUCTING CYLINDRICAL TANKS
Filed Aug. 5, 1927  3 Sheets-Sheet 2
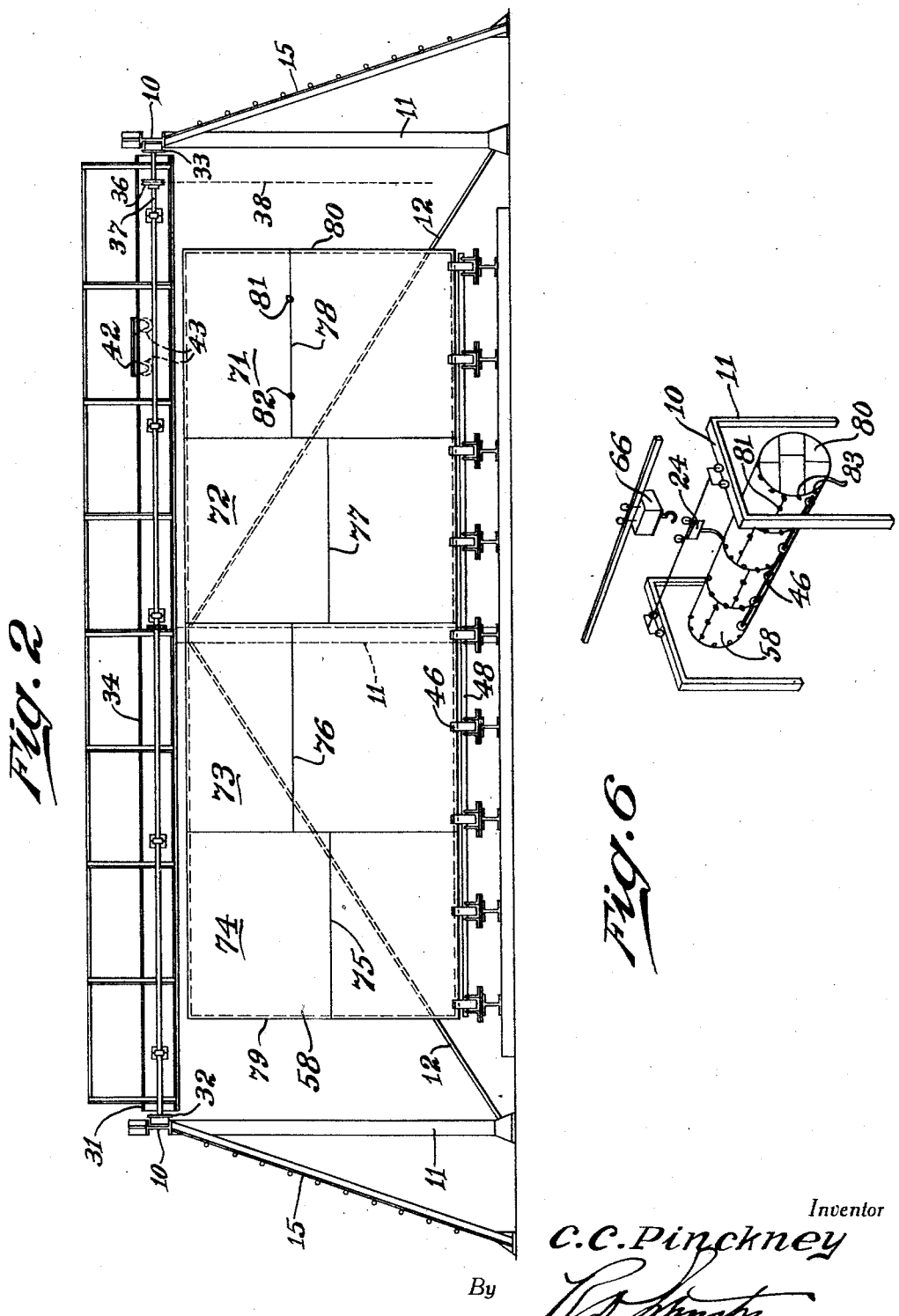
Inventor
C.C.Pinckney
By
Attorney

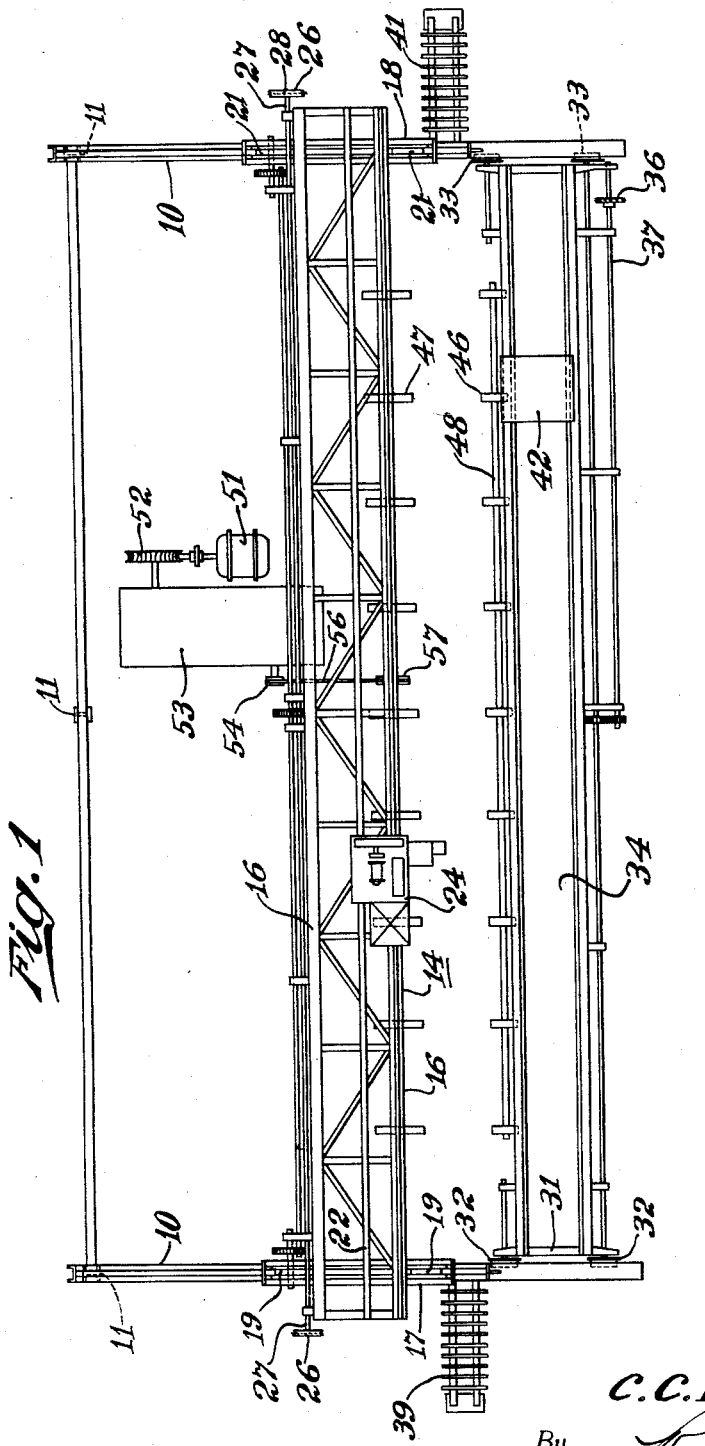

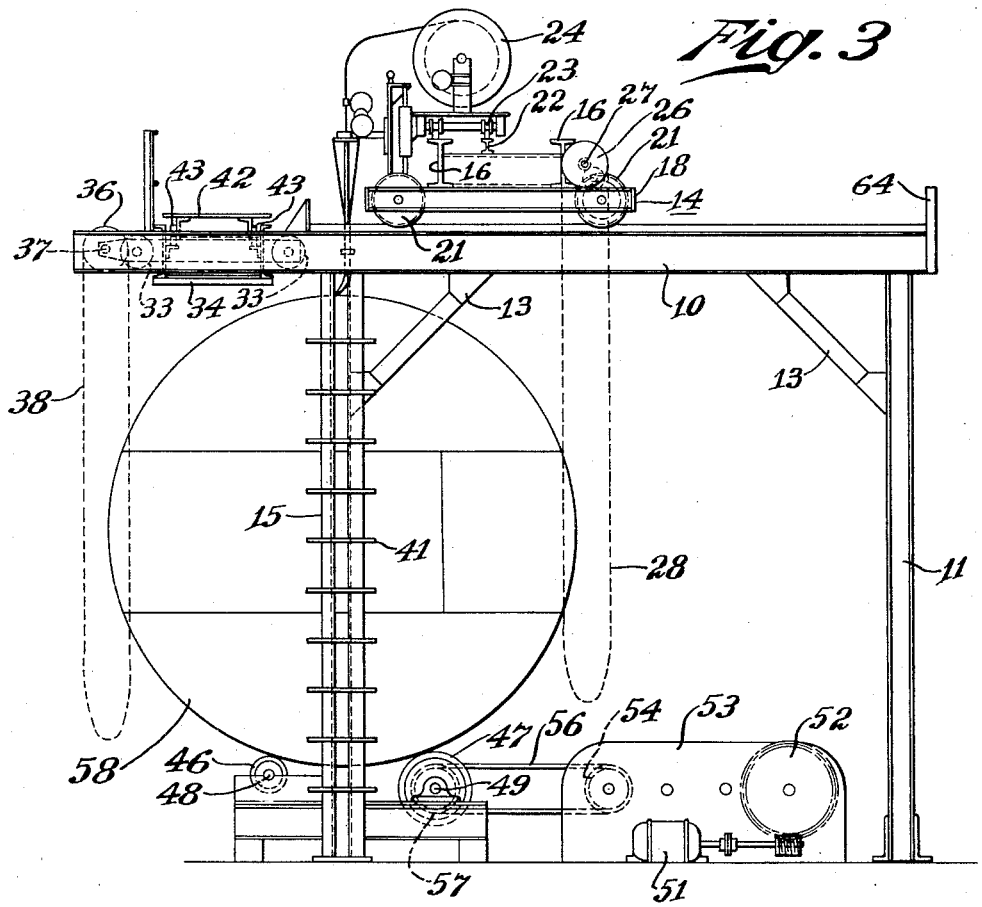

Patented Dec. 17, 1929

1,740,033

UNITED STATES PATENT OFFICE

CHARLES C. PINCKNEY, OF BIRMINGHAM, ALABAMA, ASSIGNOR TO BIRMINGHAM TANK COMPANY, A CORPORATION OF DELAWARE

METHOD AND APPARATUS FOR CONSTRUCTING CYLINDRICAL TANKS

Application filed August 5, 1927. Serial No. 210,967.

My invention relates to the manufacture of cylindrical tanks, more particularly to tanks which are of such size and construction as to be incapable of maintaining their cylindrical shape when unsupported, and has for its object the provision of an improved method and apparatus for the construction of such tanks.

A more specific object of my invention is to provide a method for the manufacture of cylindrical metallic tanks of the character designated, wherein the seams of the tank are joined together by autogenous welding, and wherein the welding operation is conducted entirely from the exterior of the tank, obviating the necessity of a supporting member or "backing up tool" within the tank, and also the provision of an improved apparatus for carrying out such a method of manufacture.

Heretofore, in the manufacture of cylindrical metallic tanks, it has been the custom to first form the sheets by rolling, it being understood that the tank comprises a plurality of courses, or belts of sheets, then to support a course with braces and with an internal supporting, or backing up tool, in order for it to maintain its cylindrical shape, and finally to weld the longitudinal joints of the course by welding apparatus, properly supported, and capable of longitudinal movement with respect to the work. When all of the courses had been so prepared, separately, the heads were put in position and welded by hand, also the circumferential seams of the tank. In the prior art, as each individual course was welded, the work was successively moved to proper position beneath the welder to form each longitudinal seam. For each course in the tank, it required several crane operations, so that to completely form and weld a tank comprising five courses, some 20-odd crane operations were required. Obviously, the labor cost and time involved in such a process of manufacture was considerable.

The method and apparatus of my invention obviates many objections to the method of the prior art, and the time and operations requisite for manufacturing a tank are materially reduced. In accordance with my invention, I bring the edges of the rolled sheets, forming a course, together and join them by "tacking", or intermittent welding, such as spot-welding, at selected points, just sufficiently for the edges to be held together in handling. The courses are next joined together to form an elongated elliptical structure. The heads of the tank are next placed in position in the structure and tacked in place, as described for a longitudinal joint. The spot-welding operation, as is well understood, may be carried out with light, portable apparatus on the grounds. When this part of the process has been completed, there results a self-supporting structure of cylindrical form, held together sufficiently that it may be handled by a crane or other suitable method, and placed in position to have all of the joints, both circumferential and longitudinal, joined together by autogenous welding in one continuous operation requiring only a single operator and dispensing with all crane operations until the tank is completed and is ready to be removed from the apparatus. The fact that the structure is self-supporting obviates the necessity of providing an interior support, or backing up tool, within the tank to hold it in position for the welding process.

In order to expeditiously carry out the above described process, I provide an improved apparatus for the welding of the tank, whereby the assembled spot welded tank may be rotated beneath the welder to form the circumferential joints, and the welding apparatus may be readily moved longitudinally of the work, to form the longitudinal joints, and, finally, after the work is completed, means are provided for readily moving the welding apparatus out of the way of the tank, so that the tank may be bodily removed by a crane without being blocked. Briefly, my improved apparatus comprises structural frame work, including upright and transverse members, the structural members being spaced apart a sufficient distance to accommodate a tank to be welded so that the tank may be bodily lifted into or out of position when the work requires. Extending longitudinally of the apparatus, and supported by the transverse members, is a plurality of structural members, supported by a suitable carriage for transverse movement of the work, and which, in turn, support a carriage which carries a suitable welding apparatus. The welding apparatus, in turn, is supported by a second carriage and other longitudinally extending members, whereby it may be moved longitudinally of the work being done. In addition, I provide a working platform which extends longitudinally of the apparatus the entire length thereof, and which is movable transversely of the apparatus, whereby it may be brought into proper position for the workmen and may be moved out of the way of the work when it is completed.

Apparatus embodying features of my invention is illustrated in the accompanying drawing, forming a part of this specification, wherein Fig. 1 is a plan view of a preferred form of apparatus;

Fig. 2 is a side elevation of the apparatus and showing a tank in position to be welded;

Fig. 3 is an end elevation of the apparatus;

Fig. 4 is a fragmentary sectional view showing the welding of a circumferential seam;

Fig. 5 is a view similar to Fig. 4, and showing the method of welding a longitudinal seam; and Fig. 6 is a diagrammatic view illustrative of the process.

Referring now to the drawings for a better understanding of my invention, I show in Figs. 1 to 3, inclusive, a framework including transverse structural members 10, arranged at each end of the apparatus, and upright members 11, arranged on one side, supporting the ends of the transverse members 10, the other ends of the members 10 being supported by structural members 15, slightly inclined from the vertical. The upright members 11 and the transverse members 10 are spaced apart a sufficient distance to accommodate the bodily placing or removal of the tank to be constructed between said members. The upright members 11 may be suitably braced, as shown at 12—12 and 13—13, in Figs. 2 and 3.

Mounted on the transverse members 10 is a carriage 14 comprising longitudinal structural members 16, supported by transverse structural members 17 and 18, the latter being supported by trucks 19 and 21, the trucks being adapted to move along the members 10 transversely of the apparatus. Mounted on the trucks 19 and 21 is an additional longitudinal beam 22, which cooperates with one of the members 16 to form a longitudinal track supporting a truck 23. The truck 23 supports a welding apparatus 24, which may be moved by means of said truck longitudinally of the structure and of the work being performed. The welding apparatus 24, as shown, is that of a well-known manufacturer and comprises no part of my invention. Accordingly, it is not described in detail in this specification. It is only necessary to state, as may be seen from the drawings, that I so mount the welding apparatus that it is capable of ready movement longitudinally and transversely of the work to be performed. In order to facilitate transverse movement of the trucks 19 and 21, I provide a well-known form of gearing means, including a sprocket-wheel 26, mounted on a shaft 27 and operable by means of a chain 28 from the ground.

As may best be seen in Fig. 2, the transverse structural members 10 are comprised of I beams, and the recesses formed between the web and flanges of these beams are employed to accommodate the wheels of a truck 31, the wheels being indicated at 32 and 33. The truck 31 supports a working platform 34, which extends from end to end of the apparatus. The truck 31 may be readily moved transversely of the apparatus by gearing means, including a sprocket-wheel 36, mounted on a shaft 37, and which carries a chain 38, whereby it may be operated from the ground. In order to reach the working platform 34 suitable ladders 39 and 41 are provided at each end of the apparatus and secured to the members 15. Carried by the working platform 34 is a truck 42, movable manually on wheels 43 along the platform. The truck 42 may be employed by the workmen for the ready moving of tools, etc., along the apparatus as the work continues.

Beneath the superstructure of the framework of the apparatus there is located a plurality of rollers 46 and 47, the rollers being mounted on shafts 48 and 49, the said shafts extending longitudinally of the apparatus, and the rollers being adapted to support a tank of large diameter upon which work is being done. The shaft 49 and rollers 47 are arranged for rotation by means of a motor 51 operating through a gear 52, a gear-box 53, sprocket-wheel 54, and a sprocket 56. The sprocket 56 rides on a sprocket-wheel 57, secured to the shaft 49.

In operation, a tank to be welded, indicated generally at 58, in Figs. 2 and 3, after being assembled in a manner to be described more particularly hereinafter, is placed upon the rollers 46 and 47. The circumferential seams in the tank are welded by rotating the rollers 47 in the manner previously described, which operation causes a slow rotation of the tank beneath the welding apparatus. By referring to Fig. 4, there will be seen the method of welding a circumferential joint. In this figure the joint is shown at 61 and the nozzle 62 of the welding apparatus is held stationary above joint 61 while the tank is being slowly rotated. When a complete rotation has been made, the joint will have been completely welded. In Fig. 5, I show the method of welding a longitudinal joint of the tank. In this view, the longitudinal joint is indicated at 63, with the nozzle 62 of the welding apparatus so directed as to build up a lap weld along the joint. During this part of the operation, the tank 58 is held stationary and the welding apparatus 24 is moved longitudinally of the tank by means of the truck 23. When the work of welding has been completed, the carriage 14 is moved transversely of the apparatus, over against a stop 64, Fig. 3, provided on the end of the transverse member 10. This moves the welding apparatus entirely out of the way. The working platform 42 is then moved over against the welding apparatus, whereupon the work may be lifted bodily out of the way by means of the crane indicated diagrammatically at 66, in Fig. 6, or by any other suitable work handling apparatus, not shown.

Referring now to Fig. 6, I illustrate diagrammatically my improved process for constructing tanks of the character described and which may expeditiously be carried out by means of my improved apparatus. As shown in the drawing, each tank comprises a plurality of courses, such as 71, 72, 73 and 74, Fig. 2, each of said courses being comprised of one or more sheets of metal, rolled to the proper shape, and joined together longitudinally as at 75, 76, 77 and 78. At the end of the tank are joined heads, such as 79 and 80. The metal from which these tanks are constructed is usually sheet metal, and the gauge of the metal and the diameter of the tank are such that one of the courses 71, 72, 73 or 74, taken alone, is not self-supporting in a cylindrical shape when laid on its side; hence the necessity, in the prior art, of providing an internal support for the courses when they are being joined together and welded. The ordinary method employed has been to place a backing up tool within the cylindrical shape while welding it, said tool being positioned opposite the welding apparatus. In addition, other internal braces and supports were provided to maintain the course in cylindrical shape while welding it. In accordance with my invention, I bring the edges of a suitably formed sheet together to provide a course of the tank, for example, the first course 71, and join them by "tacking," or short spot-welds, as at 81 and 82, just sufficient welding being done to hold the material together. The course 72 is next formed with its edges tacked together and is joined to the course 71; following this operation the remaining courses 73 and 74 are formed and joined together, and to the course 72, in the manner just described. I next insert the heads 79 and 80, properly flanged and shaped of course, and join them to the courses 71 and 74 by a series of short spot-welds, such as 83. This work of assembly, as is well understood in the art, is carried out and the spot-welds made by light, manually operable welding apparatus. Upon completing these preliminary steps of the process, I have formed a self-supporting structure which will remain cylindrical in shape regardless of the position in which it is placed, the heads 79 and 80 providing the necessary support to maintain it in a cylindrical shape. The spot-welds by which the edges of the material are joined together provide sufficient support to permit handling of the tank without its falling apart, whereupon it may be placed in proper position with respect to the welding apparatus and manipulated to completely weld all of the joints. The structure being self-supporting, there is no necessity for providing internal supporting means, or a backing up tool, to present it in proper relation to the welder as it is rotated or the welder is shifted, while carrying out this welding process.

As has been previously indicated, the tank 58 is placed upon the rollers 46 and 47 and is rotated by means of the motor 51 while bringing the nozzle 62 of the welding apparatus adjacent to a circumferential seam, preferably one of the end seams of the tank. When a longitudinal seam, such as 77, is reached, the tank is stopped from rotation and the welding apparatus is moved longitudinally to weld the longitudinal seam. When the longitudinal seam has been welded, the welding machine is stopped in its longitudinal movement and the tank is again rotated by means of motor 51, completing the welding of the next circumferential seam. This process is continued until all of the seams of the tank have been welded, and the tank may then be removed bodily, as previously described, by means of the crane 66.

From the foregoing, it will be apparent that I have devised an improved method and apparatus for the construction of cylindrical tanks which clearly reduces the time and labor of such construction, as heretofore practiced, and which is simple of design, easy of manufacture, and efficient in operation.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. Apparatus for constructing cylindrical tanks comprising framework including upright and transverse members, longitudinal members carried by the framework, suitable welding apparatus supported by the framework, means for moving the welding apparatus longitudinally and transversely of the framework, and means for rotatably holding a tank to be welded in juxtaposition with the longitudinal members.

2. Apparatus for constructing cylindrical tanks comprising a system of power operated rollers upon which the tank is mounted, structural framework including upright and transverse members spanning the rollers, welding apparatus supported by the framework, and means for moving the welding apparatus longitudinally and transversely of the tank.

3. Apparatus for constructing cylindrical tanks comprising a system of power operated rollers upon which the tank is mounted, structural framework including upright and transverse members above the rollers, a carriage spanning the rollers and supported by the transverse members and movable transversely of the framework, a second carriage supported by the first mentioned carriage and movable longitudinally thereof, welding apparatus carried by the second carriage, and means for operating the carriages.

4. Apparatus for constructing cylindrical tanks comprising structural framework including upright and transverse members spaced apart sufficiently for a tank to be lifted bodily in and out of position between said members, longitudinal structural members mounted for transverse movement on the transverse members, longitudinally movable welding apparatus mounted on the longitudinal members, and means for rotatably mounting a tank to be welded in juxtaposition with the welding apparatus.

5. In apparatus for constructing cylindrical tanks, the combination with rotatable work holding members, of structural framework spanning the work holding members, welding apparatus, means for supporting the welding apparatus on the framework in position to weld a tank from above the workholding members and including a transversely movable carriage whereby the welding apparatus may be moved out of the way of the tank when the welding operation is completed.

6. In apparatus for constructing cylindrical tanks, the combination of framework including upright and transverse members spaced apart sufficiently for a tank to be lifted in or out of position between the members, longitudinal structural members supported by the transverse members and mounted for movement transversely of the apparatus on said members, a carriage mounted for longitudinal movement on the longitudinal members, welding apparatus mounted on the carriage, and means for rotating a tank to be welded beneath the carriage.

7. In apparatus for constructing cylindrical tanks, the combination of framework including upright and transverse members spaced apart sufficiently for a tank to be lifted in or out of position between the members, longitudinal structural members supported by the transverse members and mounted for movement transversely of the apparatus on said members, a carriage mounted for movement longitudinally of the longitudinal members, welding apparatus mounted on the carriage, means for rotating a tank to be welded beneath the carriage, and a longitudinally extending working platform mounted for movement transversely of the apparatus on the transverse members to bring it in operating position with respect to the welding apparatus.

8. In apparatus for constructing cylindrical tanks, a system of power operated rollers for rotatably supporting the tank when being welded, structural framework spanning the rollers, and autogenous welding apparatus supported by the structural framework and including roller supports providing movement of the welding apparatus longitudinally and transversely of the rollers.

9. In apparatus for constructing cylindrical tanks, a power operated system of rollers for rotatably supporting the tank when being welded, structural framework including upright members with transverse members supported by the upright members and disposed at each end of the system of rollers, the transverse members forming a track, longitudinally extending structural members spanning the transverse members, a truck having wheels resting on the track formed by the transverse members, and supporting the longitudinal members, means for operating the truck to shift the longitudinal members transversely of the rollers, and autogenous welding apparatus carried by the longitudinal members and movable along said members.

10. The method of constructing cylindrical tanks, each embodying a plurality of cylindrical parts made up of rolled metallic plates and a head at each end of the tank, each part being of such size and construction as to be incapable of preserving its cylindrical shape when unsupported, which comprises joining the plates forming the parts and the heads together by intermittent welding to form a self-supporting cylindrical structure, and producing relative rotational and longitudinal movement of the structure with respect to suitable welding apparatus and in proximity thereto in order to weld the joints of the tank.

11. The method of constructing cylindrical metallic tanks of such size as to be incapable of remaining cylindrical in shape when unsupported and each of which embodies a plurality of cylindrical parts and a head at each end thereof, which comprises joining the cylindrical parts and the heads of the tank together by intermittently spaced holding means to form a self-supporting cylindrical structure, and producing relative longitudinal and rotary movement of the tank with respect to suitable welding apparatus and in proximity thereto to weld the joints of the tank.

12. The method of constructing cylindrical tanks, which comprises joining the edges of suitably rolled metallic plates by intermittently spaced holding means so as to form a plurality of cylindrical shapes, each incapable of remaining in such shape when unsupported, similarly joining the cylindrical shapes together to form an elongated cylindrical structure, placing heads at each end of the cylindrical structure in position and joining them thereto by intermittent welding to form a self-supporting cylindrical structure, rotating the structure thus assembled in proximity to suitable welding apparatus to weld the circumferential joints, and moving the welding apparatus longitudinally of the tank to weld the longitudinal joints.

13. The method of constructing cylindrical metallic tanks, each embodying a plurality of cylindrical parts and a head at each end thereof, each course being incapable of preserving its cylindrical shape when unsupported, which comprises joining the parts and the heads of the tank together by intermittent welding to form a self-supporting cylindrical structure, rotating such structure in proximity to suitable welding apparatus to weld the circumferential seams of the tank, and moving the welding apparatus longitudinally of the tank to weld the longitudinal seams.

In testimony whereof I affix my signature.

CHARLES C. PINCKNEY.